US012123530B2

(12) United States Patent
Choo et al.

(10) Patent No.: US 12,123,530 B2
(45) Date of Patent: Oct. 22, 2024

(54) COUPLING ASSEMBLY WITH VALVES

(71) Applicant: Hanil Tube Corporation, Incheon (KR)

(72) Inventors: Seong-hwa Choo, Incheon (KR); Sung-ryong Eom, Gyeonggi-do (KR); Dong-hyeok Lee, Gyeonggi-do (KR); Iris Barthel, Schauenburg (DE); Paul Polinski, Kassel (DE); Kay Bube, Schenklengsfeld (DE); André Häckel, Waldeck (DE)

(73) Assignee: Hanil Tube Corporation, Incheon (KR)

( * ) Notice: Subject to any disclaimer, the term of this patent is extended or adjusted under 35 U.S.C. 154(b) by 0 days.

(21) Appl. No.: 17/961,880

(22) Filed: Oct. 7, 2022

(65) Prior Publication Data
US 2023/0116782 A1    Apr. 13, 2023

(30) Foreign Application Priority Data
Oct. 8, 2021   (EP) ..................................... 21201566

(51) Int. Cl.
*F16L 37/32*    (2006.01)
*F16L 37/088*   (2006.01)
(Continued)

(52) U.S. Cl.
CPC ........... *F16L 37/32* (2013.01); *F16L 37/0885* (2019.08); *B60L 58/26* (2019.02); *F16L 37/1225* (2013.01); *F16L 37/35* (2013.01)

(58) Field of Classification Search
CPC . F16L 37/35; F16L 37/34; F16L 37/32; F16L 37/30; F16L 37/1225; F16L 37/0885; F16L 37/144; B60L 58/26
See application file for complete search history.

(56) References Cited

U.S. PATENT DOCUMENTS 2,310,073 A  *  2/1943  Hutchison ............... F16L 37/12
                                                137/899.2
2,316,578 A  *  4/1943  Hutchison ............... F16L 29/00
                                                137/614.03
(Continued)

FOREIGN PATENT DOCUMENTS

CN    112212103 A  *  1/2021   ............. B60L 58/26
CN    112393045 A  *  2/2021
(Continued)

OTHER PUBLICATIONS

English translation of Japanese Office Action from JP2022-160765 dated Feb. 15, 2024.

*Primary Examiner* — David Colon-Morales
(74) *Attorney, Agent, or Firm* — Dickinson Wright PLLC (57) ABSTRACT

A coupling bushing includes a bushing body and a retainer for locking a coupling plug into the bushing body. The bushing body has a connecting section and a coupling section, wherein the connecting section and the coupling section are fluidically connected with each other via an inner channel. A bushing valve is arranged in the inner channel (8), wherein the bushing valve (10*a*) comprises a valve holder, an axially movable valve body and a valve seat. The retainer has at least one latching element, wherein the at least one latching element has a resiliently elastic design. The at least one latching element is designed to engage with a coupling plug.

12 Claims, 4 Drawing Sheets

(51) Int. Cl.
   *B60L 58/26*   (2019.01)
   *F16L 37/12*   (2006.01)
   *F16L 37/35*   (2006.01)

(56) References Cited

U.S. PATENT DOCUMENTS

| | | | | |
|---|---|---|---|---|
| 2,322,139 A * | 6/1943 | Kaelin | F16K 1/427 | 137/515.3 |
| 2,675,250 A * | 4/1954 | Paquin | F16L 37/252 | 137/614.02 |
| 3,283,780 A * | 11/1966 | Sutton | F16L 37/32 | 137/614.04 |
| 3,450,424 A * | 6/1969 | Calisher | F16L 37/34 | 285/305 |
| 3,498,324 A * | 3/1970 | Breuning | F16L 37/23 | 137/614.04 |
| 3,788,348 A * | 1/1974 | Johnson | F16L 37/23 | 137/614.04 |
| 4,200,121 A * | 4/1980 | Walter | F16L 37/23 | 251/149.6 |
| 5,255,699 A * | 10/1993 | Herzan | F16L 37/23 | 137/1 |
| 5,323,811 A * | 6/1994 | Hohmann | F16L 37/098 | 137/614.04 |
| 5,469,887 A * | 11/1995 | Smith, III | F16L 37/35 | 137/614.04 |
| 5,479,960 A * | 1/1996 | Kirkman | E21B 33/0355 | 137/614.04 |
| 5,709,243 A * | 1/1998 | Wells | F16L 37/34 | 137/614.01 |
| 6,145,322 A * | 11/2000 | Odashima | F16L 37/32 | 62/50.7 |
| 6,158,717 A * | 12/2000 | Van Scyoc | F16L 37/34 | 251/149.6 |
| 6,206,040 B1 * | 3/2001 | Smith, III | F16L 29/00 | 137/614.04 |
| 6,237,631 B1 * | 5/2001 | Giesler | F16L 37/23 | 251/149.6 |
| 6,328,348 B1 * | 12/2001 | Cornford | F16L 37/34 | 285/305 |
| 6,354,564 B1 * | 3/2002 | Van Scyoc | F16L 37/32 | 137/614.04 |
| 7,401,626 B1 * | 7/2008 | Plattner | F16L 37/107 | 137/614.05 |
| 7,921,875 B2 * | 4/2011 | Moriiki | F16L 37/32 | 137/614.04 |
| 8,246,085 B2 * | 8/2012 | Kitagawa | F16L 37/23 | 137/614.04 |
| 8,251,084 B2 * | 8/2012 | Brown | F16L 37/26 | 137/614.04 |
| 9,273,812 B2 * | 3/2016 | Bassaco | F16L 37/0885 | |
| 9,677,699 B2 * | 6/2017 | Barthel | F16L 37/1225 | |
| 9,810,137 B2 * | 11/2017 | Presetschnik | B60L 1/003 | |
| 9,909,703 B2 * | 3/2018 | Van Scyoc | F16L 37/32 | |
| 10,082,234 B2 * | 9/2018 | Gennasio | F16L 37/23 | |
| 10,184,569 B2 * | 1/2019 | Thomas | F16K 1/12 | |
| 10,221,980 B2 * | 3/2019 | Tiberghien | F16L 37/34 | |
| 10,427,539 B2 * | 10/2019 | Dinh | F16L 37/34 | |
| 10,876,636 B2 * | 12/2020 | Thomas | F16K 1/465 | |
| 10,975,982 B2 * | 4/2021 | Wilhelm | F16K 35/025 | |
| 11,168,824 B2 * | 11/2021 | Tandberg | F16L 37/32 | |
| 11,320,076 B2 * | 5/2022 | Rohde | F16L 37/0885 | |
| 11,511,648 B2 * | 11/2022 | Yoshida | B60L 50/64 | |
| 11,515,586 B2 * | 11/2022 | Guerra | H01M 10/663 | |
| 11,603,954 B2 * | 3/2023 | Clever | F16L 55/1015 | |
| 11,664,545 B2 * | 5/2023 | Agathocleous | H01M 10/66 | 429/72 |
| 2002/0079473 A1 * | 6/2002 | Jeory | F16L 37/28 | 251/149.6 |
| 2012/0025523 A1 * | 2/2012 | Zhu | F16L 37/0885 | 285/374 |
| 2013/0019973 A1 * | 1/2013 | Gose | F16L 37/23 | 285/332.2 |
| 2014/0373949 A1 * | 12/2014 | Manzato | F16L 37/32 | 137/614.04 |
| 2020/0182389 A1 * | 6/2020 | Frère | F16K 15/063 | |

FOREIGN PATENT DOCUMENTS

| | | | | |
|---|---|---|---|---|
| EP | 3522291 A1 * | 8/2019 | | F16L 37/144 |
| EP | 3913272 A4 * | 11/2021 | | F16L 37/0885 |
| FR | 2906341 A3 * | 3/2008 | | F16L 37/088 |
| GB | 868631 A * | 5/1961 | | |
| JP | S531165223 A | 10/1978 | | |
| WO | WO-0004316 A1 * | 1/2000 | | F16L 37/28 |
| WO | WO-2017016897 A1 * | 2/2017 | | |

* cited by examiner

COUPLING ASSEMBLY WITH VALVES

RELATED APPLICATIONS

The present disclosure is a national phase application of European Application 21201566.3, filed on Oct. 8, 2021, the entire contents of which is incorporated herein by reference.

FIELD

The present disclosure relates to a coupling bushing for fluidic coupling with a coupling plug, for connection with a tube or with an aggregate, wherein a bushing valve is arranged in the coupling bushing.

BACKGROUND

A coupling bushing of the kind described at the outset is known from DE 10 2004 026 209 B4, and used to close the fluid path while releasing the coupling assembly. The retainer is configured as an axially movable and spring-loaded sleeve that envelops the coupling body, and secures closure balls distributed around the periphery of the coupling bushing. For locking purposes, the closure balls engage into a circumferential groove of the coupling plug. A coupling plug with a complementary design to the coupling bushing comprises an essentially cylindrical coupling surface, which in the latched state of the coupling plug is arranged in a sealing section of the coupling bushing. The sealing section has a seal in the form of a sealing ring, which is held in the sealing section with the help of a groove on the inner side of the bushing body. The coupling surface of the coupling plug and the sealing ring of the coupling bushing are dimensioned in such a way as to achieve a fluid-tight coupling between the coupling plug and coupling bushing.

The bushing body in DE 10 2004 026 209 B4 comprises two separately designed bushing body parts, specifically an axially inward intermediate piece and an axially outward main piece. The intermediate piece and the main piece are connected with each other in a fluid-tight manner by means of a threaded connection as well as a sealing ring. An axially inward end section of the intermediate piece forms the connecting section for a tube, while the axially outward end carries the valve holder, a valve guide, a reset element as well as the valve body. The valve body of the intermediate piece reaches far inside the main piece, and there strikes against the valve seat. Therefore, the coupling bushing is designed in such a way that the valve holder and the valve body can be inserted or are inserted into the coupling bushing in an axially outward direction. By contrast, the valve seat is an integral part of the bushing body or the main piece. The coupling plug or its plug body is designed analogously to the bushing body, and likewise comprises a main and intermediate piece, and is equipped with a valve, the plug-in valve, as it were. The two-part design of the bushing body or plug body serves to make the interior valve holder easier to manufacture, and is the core idea of DE 10 2004 026 209 B4.

BRIEF SUMMARY

We have discovered a disadvantage to the known coupling bushing and to the known coupling plug from DE 10 2004 026 209 B4 in that, while closing and releasing the coupling assembly, one hand must hold the coupling plug, and the other hand must hold the coupling bushing, while the sleeve must at the same time be pushed back against the spring force. In this respect, the known coupling assembly is somewhat cumbersome in terms of handling, which carries weight in particular in the constricted installation space of a motor vehicle. Space is there often available only for one hand. Therefore, the present disclosure provides a coupling bushing and a coupling plug which can be released from each other in a fluid-tight manner, while at the same time requiring the least possible installation effort.

This is achieved by a coupling bushing for fluidic coupling with a coupling plug, wherein the coupling bushing comprises a bushing body, wherein the bushing body comprises a connecting section for connection with a tube or with an aggregate, and a coupling section for coupling with a coupling plug, wherein the coupling bushing is designed in such a way that a coupling plug can be inserted into the coupling bushing, wherein the coupling bushing has a retainer for locking a coupling plug into the bushing body, wherein the coupling section and the connecting section of the bushing body are fluidically connected with each other via an inner channel, wherein the portion of the inner channel allocated to the coupling section, in a longitudinal section of the coupling bushing, defines a center axis as well as an axial and a radial direction as well as a circulating direction, wherein the coupling section is closed by a coupling opening in an axially outward direction, wherein a bushing valve is arranged in the inner channel, wherein the bushing valve comprises a valve holder, an axially movable valve body and a valve seat, wherein the valve holder and the valve seat define a valve section of the bushing body or the coupling bushing in an axial direction, wherein the coupling bushing is designed in such a way that the valve body abuts fluid-tight against the valve seat in a locked state of the bushing valve, and does not abut against the valve seat in an open state of the bushing valve, wherein the retainer comprises at least one latching element, wherein the at least one latching element has a resiliently elastic design, wherein the at least one latching element is designed to engage with a coupling plug.

The present disclosure is based upon the discovery that the locking mechanism from DE 10 2004 026 209 B4 has a disadvantageous design in terms of handling. It was found that this disadvantage can be eliminated by giving the at least one latching element a resiliently elastic design, wherein the at least one latching element is designed for engagement with a coupling plug. As a consequence, the present disclosure is characterized in that the at least one latching element simultaneously combines the functions of locking and resetting. During insertion into the coupling bushing, this allows the coupling plug to elastically deform the at least one elastically deformable latching element in such a way that the latter stores a reset energy, while at the same time clearing the way for the coupling plug. This eliminates the need for a spring of the kind disclosed in DE 10 2004 026 209 B4, since its function is realized in the latching element itself. As a consequence, it is also no longer necessary to pull back the sleeve, so that handling is simplified. In particular, this makes it possible to connect the coupling bushing or the coupling plug with the respective other coupling element with one hand while fixing the respective other coupling element in place. The coupling plug is automatically locked into the coupling bushing just by axially merging the two coupling elements of the coupling assembly, thereby achieving the object mentioned at the outset.

In DE 10 2004 026 209 B4, the intermediate piece and the main piece of the bushing body are connected with each other via a threaded connection. To this end, the intermediate piece has a hexagonal part, which can be gripped by a tool—such as an open-end wrench or a socket—so as to tighten the intermediate piece. Both the thread and the hexagonal part signal that the intermediate piece and the main piece are made out of steel. These go with the closure balls, which impart a very stable shape and very high-quality appearance to the coupling bushing, as it were. Such products are advantageous in particular in the area of laboratory, factory, and workshop equipment and the like, where professionals often work with fluid couplings. One example would be fluid couplings for hydraulic or pneumatic tools. Fluid couplings in these facilities are routinely not exposed to the extremely constricted conditions in engine compartments, so that the problem of compactness or simplified handling addressed in DE 10 2004 026 209 B4 does not even arise. In addition, motor vehicles do not require coupling assemblies trimmed to a high-quality appearance in this way. By contrast, if the coupling assembly described at the outset were to have been fabricated out of plastic, the latching elements could be manufactured much better, but this would at the same time worsen the appearance from a quality standpoint in the eyes of the professional user in laboratories and workshops. Therefore, the locking mechanism according to the prior art mentioned at the outset is well tailored to the rest of the coupling assembly.

It is expedient that the terms "bushing" and "plug" be understood as complementary. The term "complementary" preferably means that the coupling plug can be inserted into the coupling bushing in a fluid-tight manner. The term "tube" preferentially means rigid and less rigid fluid lines, so as to also include hoses, for example. The word "aggregate" preferably refers to fluid components other than fluid lines, for example tanks, pumps, injection nozzles and the like.

The term "axially outward" preferably means the axial direction of the respective section of the coupling bushing or the coupling plug toward the coupling opening of the coupling bushing or the coupling opening of the coupling plug. Consequently, the terms "inwardly" and/or "inward" denote the respective axial direction toward the front end of the connecting section of the coupling bushing. In the case of the coupling plug, "axially inward" means the direction toward a front end of the terminal section of the coupling plug.

The term "locked state" preferably refers to a state of the coupling assembly in which the retainer of the coupling bushing has become engaged with a locking element of the coupling plug. A released state of the coupling assembly is expediently present given the absence of a locked state.

It is preferred that the coupling bushing comprise a seal, wherein the seal is preferably designed as a sealing ring. The seal or the sealing ring preferably comprises an elastomer. The seal or the sealing ring is preferably arranged on an inner side of the bushing body that faces the inner channel. The seal or the sealing ring is advantageously held in a groove on the inner side of the bushing body. It is possible that the groove on the inner side of the bushing body be formed by a radially inwardly protruding shoulder. It is advantageous that a seal holder, in particular in the form of a seal holder ring, be placed in the bushing body, and form a wall of the sealing groove lying opposite the shoulder. The sealing ring is preferably arranged in an axial direction between the valve seat and the retainer. It is preferred that a sealing section be defined by the axial expansion spanned by the seal holder and the valve seat. The sealing section is preferably arranged between the coupling section and the valve section of the bushing body.

The coupling bushing or the coupling plug is preferably designed in such a way that the valve holder and/or the valve body and/or the valve seat is/are inserted into the bushing body/plug body in an axially inward direction. This is initially based upon the knowledge that the two-part design of the bushing body or plug body complicates matters, because the two parts must be separately manufactured, and thus require two injection molding tools given the preferred use of plastic. In addition, the fluid-tight connection requires very low tolerances, which likewise entails effort. The two parts would then have to be welded together or latched with each other, and additionally sealed via a sealing ring. It was found that this expenditure of effort is reduced by inserting the valve into the bushing body/plug body from the opposite direction, and hence in an axially inward direction. This significantly reduces the effort involved. In particular, it was found that the reduction in effort expended as the result of the preferred one-part design of the bushing body or plug body exceeds the effort caused by inserting a separate valve seat. This is because if the valve body is to be inserted in an axially inward direction and simultaneously form an axially outward seal, it is preferred that the valve seat only be inserted after the valve body. If the valve seat were already to be inserted beforehand or even be designed integrally with the bushing body/plug body, it would be impossible or extremely difficult to bring the valve body to its designated location through the valve seat. Inserting the bushing valve or the plug-in valve in an axially inward direction thus makes it possible to create a coupling assembly which can be released in a fluid-tight manner, while at the same time requiring a lower production outlay.

According to an embodiment, the bushing body/plug body has a one-piece design, and preferably an integral design. The term "one-piece" preferably denotes a bushing body or plug body which can only be disassembled into several parts irreversibly, and hence only destructively. For example, a welded connection between two plastic parts represents an irreversible connection, and thus a one-piece element. The term "integral" refers in particular to those elements fabricated in a single injection molding process with a single material. It is preferred that the bushing body or plug body consist of plastic, and preferably only of plastic.

It is possible for the bushing body or plug body to have a multipart configuration, and at least two bushing body parts or plug body parts or a main piece and an intermediate piece. In specific fluid systems, it is advantageous that the main piece be combinable with several variants of the intermediate piece. The two bushing body parts/plug body parts can be irreversibly connected with each other via welding. According to an embodiment, the at least two bushing body parts/plug body parts can be mechanically connected with each other through latching or force closure, and preferably fluidically sealed at the connection point by at least one sealing ring.

The bushing body can be angled or straight in design. A bushing body with a straight design is preferably understood to mean that the center axis of the coupling section is concentric or identical to a longitudinal axis of the connecting section. The term "angled bushing body" is expediently understood to mean that the longitudinal axis of the connecting section runs angled in a longitudinal section of the bushing body relative to a center axis of the coupling section. It is preferred that the bushing body comply with the VDA standard or the SAE standard for fluid couplings.

It is preferred that the valve seat be a component manufactured separately from the bushing body. The valve seat is expediently not integrally designed with the bushing body. The valve seat preferably comprises a plastic, and further preferably only plastic. The valve seat is preferably ring shaped, and further preferably circular. The valve seat can be inserted into the bushing body through force closure and/or form closure and/or material closure. The valve seat is advantageously latched or clamped into the bushing body. It is advantageous for the bushing body to have a radially inwardly extending protrusion, which the valve seat strikes in an axially inward direction during insertion into the bushing body. It is preferred that the valve seat abut against the radially inwardly extending protrusion, and preferably be connected or fastened to the latter. The protrusion expediently defines the axial position of the valve seat. It is advantageous that the valve seat be arranged in an axial direction between the valve holder and the seal or the sealing ring. The effect of separately manufacturing the valve seat relative to the bushing body is that the valve seat can then be inserted into the bushing body afterwards. As a result, the remaining valve components can initially be inserted into the valve section of the bushing body coming from the coupling opening, in order to subsequently or finally insert the valve seat into the bushing body. As a result, the bushing valve does not have to be inserted into the bushing body coming from the connecting section, so that the bushing body as a whole can be manufactured as a one-piece and even as an integral part. This ensures a lower production outlay during the manufacture of the bushing body, and moreover a greater stability, and ultimately a fluid tightness of the coupling bushing.

The bushing body or plug body preferably comprises a radially inwardly extending projection, to which the valve holder is connected or fastened. It is preferred that the valve holder be designed separately from the bushing body or plug body. The valve holder advantageously comprises a plastic, and preferably only plastic. It is advantageous that the valve holder strike or abut against the projection in an axially inward direction. The valve holder is advantageously connected or fastened to the projection via force closure and/or form closure and/or material closure. In particular latching is possible as the attachment by way of form closure. For example, a connection via force closure can be achieved via a radially acting press fit. Predominantly welding—in particular laser welding—is possible as the material closure. The effect of separately manufacturing the valve holder relative to the bushing body or plug body is that it makes injection molding the bushing body or plug body much easier. In addition, the valve guide can then already be inserted into the valve holder outside of the bushing body, thereby simplifying assembly somewhat at this point.

The valve holder of the bushing body or plug body advantageously has a guide passage. The guide passage is preferably arranged on a radially inner area of the valve holder. The guide passage is expediently designed in such a way that the valve guide or the guide foot of the valve guide can slide in an axial direction through the guide passage. The valve holder expediently comprises a ring, which preferably is arranged in a radially outer area of the valve holder. It is preferred that the ring of the valve holder abut against an inner side of the bushing body. In particular, the ring of the valve holder can have at least one latching element to be latched in the bushing body or plug body. The ring and the guide passage are preferably connected with each other in a radial direction by at least two/three/four struts of the valve holder. It is preferred that windows which allow fluid to pass through be arranged between the struts as viewed in an axial direction toward the valve holder. It is advantageous that the valve holder be arranged between the connecting section and the valve seat. This feature defines the working direction of the bushing valve or plug-in valve, so that the valve body expediently works and seals in an axially outward direction.

An inner diameter of the connecting section is advantageously smaller than an inner diameter of the valve section and/or than an inner diameter of the sealing section and/or an inner diameter of the coupling section. An inner diameter of the valve section is preferably smaller than an inner diameter of the sealing section and/or an inner diameter of the coupling section. An inner diameter of the sealing section is expediently smaller than an inner diameter of the coupling section. The effect of this feature or these features is that this creates an especially compact bushing body, which simultaneously ensures low flow resistances. In addition, the different inner diameters allow for the possible formation of steps on an inner side of the bushing body, against which the valve holder and/or the valve seat can abut for stability purposes.

According to a preferred embodiment, the valve body of the coupling bushing or the coupling plug in a longitudinal section has a section that expands in an axially outward direction, and a section that tapers in an axially outward direction. At least portions of the section that expands in an axially outward direction are preferably congruent with a/the rear surface of the valve body. The term "rear surfaces" preferably denotes the visible surface of the valve body as viewed axially outward. At least portions of the section of the valve body that tapers in an axially outward direction are congruent with a/the sealing surface. The sealing surface is preferably a circular section of a front surface of the valve body, which in the locked state of the bushing valve abuts against the valve seat. The effect of the expanding and tapering section is to design the valve body with the lowest possible flow resistance. The expanding and tapering section can have a respective conical design, but in the longitudinal section can also have a rounded design.

It is preferably advantageous that the valve body comprise a plastic, and further preferably an elastomer. The elastomer is preferably a rubber or a thermoplastic elastomer. It is very particularly preferred that the elastomer form the sealing surface of the valve body. The effect of the elastomer lies in particular in that it results in an especially good seal between the valve body and valve seat. It is preferred that the valve body consist only of an elastomer. The valve body advantageously has a one-piece, and in particular integral, design. A valve guide is advantageously fastened to the valve body via a force closure between the valve guide and the valve body. In an embodiment, the valve body comprises the elastomer and an additional plastic. The additional plastic preferably has a greater hardness. The elastomer advantageously envelops at least portions of the additional plastic in an axial and/or radial direction. The additional, harder plastic preferably forms support structures, e.g., ribs, struts, or the like.

The rear side of the valve body of the bushing valve or its front side facing the valve holder preferably comprises a guide receptacle for accommodating portions of a/the valve guide or a/the valve guide head. It is preferred that the guide receptacle be designed to accommodate at least portions of a/the reset element. The valve body of the bushing valve is advantageously arranged in an axial direction between the valve holder and the seal or the coupling opening. It is advantageous that portions, and in particular only portions, of the valve body be arranged between the valve holder and the valve seat in the locked state of the bushing valve.

The retainer preferably comprises at least two latching elements. The at least one latching element is advantageously designed so that it can be deformed—in particular by the coupling plug—while storing a reset energy. It is preferred that the at least one latching element again release the stored reset energy and return to the undeformed state with a/the coupling plug completely introduced. It is very preferred that the at least two latching elements be connected with each other as one piece, and preferably in an integral manner. The retainer advantageously has a one-piece design, and further preferably an integral design. The retainer can be shaped like a U or like a ring. It is very preferred that the retainer be movably mounted on the bushing body. The latching elements can preferably be moved in the radial direction for purposes of latching to the coupling plug. It is very preferred that the latching elements be designed so that they can move in the radial direction, such that the engagement with the coupling plug can be released. The retainer can comprise a metal and/or a plastic. The effect of the one-piece retainer feature is to reduce the manufacturing outlay. This feature is additionally advantageous with regard to compactness and loss protection.

The bushing valve or plug-in valve expediently has a reset element—preferably a spring, and further preferably a coil spring, wherein the reset element exerts a force on the valve body, preferably in the direction of the valve seat. The reset element is advantageously arranged between the valve holder and the valve body. The reset element is preferably mounted or supported on the valve holder. The reset element is preferentially mounted on the valve body, or accommodated therein. In a locked state of the bushing valve or plug-in valve, it is very preferred that the reset element press against the valve body with an axially outward end, and against the valve holder with an axially inward end.

It is preferred that the bushing valve or plug-in valve comprise a valve guide, wherein the valve guide defines the direction of movement of the valve body, wherein it is preferred that the valve body envelop at least axial portions of the valve guide in a radial direction. The valve body preferably envelops at least axial portions of the valve guide in a radial direction completely circumferentially. By contrast, DE 10 2006 008 291 B4 discloses that the inner side of the bushing body forms the valve guide for the valve body. As a consequence, the valve body does not envelop the valve guide in this prior art, but rather the valve guide envelops the valve body. The effect of the valve body enveloping the valve guide is that the valve body can be given an elastically resilient design. If the valve body were to have an elastic design, and at the same time slide along an inner side of the bushing body or plug body, the friction would be far too great.

The valve guide of the bushing valve or plug-in valve advantageously has a rail-like or rod-like design. The valve guide preferably comprises an axially outward guide head and an axially inward guide foot. It is preferred that the guide head of the valve guide be arranged or fastened to the valve body, and preferably in the valve body. It is preferred that the guide foot be mounted so that it can slide in an axial direction in the valve holder or in the guide passage of the valve holder. In order to improve fastening on the valve body or in the valve body, the guide head can be designed so as to project in a radial direction.

According to a preferred embodiment, the valve body of the bushing valve or plug-in valve has an axially outward front end, wherein the axially outward front end preferably comprises a flat pressure surface, wherein the flat pressure surface preferably is located in a plane situated perpendicular to the center axis or middle axis. The center axis or middle axis advantageously runs through the pressure surface, and further preferably through a midpoint of the pressure surface. In a front view of the valve body, the pressure surface can be circular in design, but can also have a polygonal and asymmetrical configuration. The effect of the flat pressure surface is first and foremost that the valve bodies are stably supported on each other in the locked state of the coupling assembly.

It is preferred that the pressure surface of the bushing valve or plug-in valve be the surface of the valve body standing the most axially outward. In a front view of the valve body, the pressure surface is preferably the radially innermost surface of the valve body. It is preferred that the pressure surface of the valve body outwardly protrude in an axial direction relative to the valve seat in the locked state of the bushing valve or plug-in valve. The effect of this feature is to enable a pressure contact with an identically structured valve body of the respective other coupling element, so that one and the same valve body can be used for both coupling elements, and in particular so that valve bodies with a mutually complementary design are not required. It is preferred that a/the surface of the valve body that expands in an axially inward direction in the longitudinal section indirectly or directly adjoin the pressure surface in an axial and/or in a radial direction.

The axial position of the valve body of the bushing valve in the locked state of the bushing valve is preferably located axially further outward in relation to the axial position of the valve body in the open state of the bushing valve. This makes it possible to mutually actuate the two valves. According to a preferred embodiment, the valve body of the bushing valve is located completely outside of the connecting section in the locked state and/or in the open state of the bushing valve. The effect of the valve body being arranged completely outside of the connecting section is that it results in a smaller flow resistance in the connecting section or a more compact connecting section. It is preferred that portions of the valve body of the bushing valve protrude in an axial direction into the sealing section in the locked state of the bushing valve.

It is preferred that a fluid line have a coupling bushing described above as well as a pipe, wherein the pipe is preferably plugged onto the connecting section or plugged into the connecting section. The connecting section is expediently designed in such a way that a pipe can be plugged onto the connecting section or into the connecting section. The connection between the pipe and the connecting section can be achieved through a form closure and/or a force closure and/or a material closure. For example, the connection through force closure can be established by radially expanding the pipe while slipping it onto the connecting section, so that a press fit is achieved. For example, the force closure can be improved even further by having the connecting section exhibit at least partially circumferential ribs. For example, a material connection is possible by means of welding, in particular laser welding or friction welding. Among other ways, a form closure can be generated by an interior groove in the pipe. According to a preferred embodiment, the pipe is inserted into the connecting section, and materially fastened to the connecting section via welding, in particular laser welding. Another preferred embodiment involves plugging the pipe onto the connecting section, wherein the connecting section has at least one circumferential rib on its exterior side.

It is preferred that the coupling bushing or the coupling plug have a flow optimized design, since the bushing valve or plug-in valve causes a rather significant flow resistance. It is advantageous if a side of the valve seat of the bushing valve or plug-in valve facing the valve holder expands in an axially inward direction, preferably in a rounded manner, in the longitudinal section of the coupling bushing or the coupling plug. It is very preferred that an axially inward front side of the valve guide of the bushing valve or plug-in valve taper in an axially inward direction in the longitudinal section, preferably in a rounded manner. It is preferred that the tapering front side of the valve guide of the bushing valve or plug-in valve align with the valve holder in an open state of the bushing valve or the plug-in valve.

Easier handling and installation is provided by a coupling plug for fluidic coupling with a coupling bushing, in particular with a coupling bushing according to the present disclosure, wherein the coupling plug comprises a plug body, wherein the plug body comprises a terminal section for linking to a pipe or an aggregate, and a coupling surface for coupling with a coupling bushing, wherein the coupling plug is designed in such a way that a coupling bushing can be plugged onto the coupling plug, wherein the coupling plug has a locking element for locking the coupling plug into a coupling bushing, wherein the axial section of the plug body allocated to the coupling surface and the terminal section are fluidically connected with each other via a fluid channel, wherein the portion of the fluid channel allocated to the coupling surface defines a middle axis as well as an axial and a radial direction as well as a circumferential direction in a longitudinal section of the coupling plug, wherein the coupling surface is closed in an axially outward direction by a coupling opening, wherein a plug-in valve is arranged in the fluid channel, wherein the plug-in valve comprises a valve holder, an axially movable valve body and a valve seat, wherein the valve holder and the valve seat define a valve section of the plug body or the coupling plug in an axial direction, wherein the coupling plug is designed in such a way that the valve body abuts fluid-tight against the valve seat in a locked state of the plug-in valve, and does not abut against the valve seat in an open state of the plug-in valve, characterized in that the coupling plug is designed in such a way that the valve holder and/or the valve body and/or the valve seat can be inserted or is/are inserted into the plug body in an axially inward direction, wherein the axial position of the valve body in the locked state of the plug-in valve is located axially further outward in relation to the axial position of the valve body in the open state of the plug-in valve.

It is preferred that the plug body have a middle section. The middle section is expediently located between the terminal section and the valve section. The plug body advantageously comprises a locking element. The locking element is preferably designed to lock the coupling plug into the coupling bushing with a retainer of a/the coupling bushing. It is preferred that the locking element or the retainer be designed in such a way that the coupling plug can be releasably locked in the coupling bushing. The locking element can have at least one edge, with the help of which the coupling plug locks on a/the latching element of the coupling bushing. The edge can be part of a shoulder, a circumferential collar, or a groove of the plug body. The locking element is preferably configured like a shoulder, circumferential collar and/or groove.

At least portions of the coupling surface are advantageously cylindrical in design. It is preferred that the coupling surface of the coupling plug be designed complementary to the sealing section or to the seal of the coupling bushing. The plug body preferably comprises a conical portion. The conical portion is preferably designed in such a way that introducing the coupling plug into the coupling bushing deforms or tensions the at least one latching element of the coupling bushing or elastically spreads apart the two latching elements. The conical portion is advantageously located between the coupling surface and the locking element.

The plug body preferentially comprises at least one safety part and preferably two safety parts. The at least one safety part is expediently designed to be engaged with a safety element of the coupling bushing as a safeguard against twisting. It is preferred that the two safety parts be arranged diametrically to each other with respect to the middle axis. It is preferred that the at least one safety part be arranged in an axial direction between the terminal section and the coupling surface or the conical portion or the locking element. The plug body preferably comprises a flange. The flange is preferably arranged between the coupling surface and the terminal section. The flange expediently extends in a radial direction from the terminal section to the at least one safety part. The plug body is preferably designed in such a way that the flange serves as a stop for a fluid element pushed onto the terminal section, in particular for a pipe.

The plug body can be angled or straight in design. A plug body with a straight design is preferably understood to mean that the center axis of the valve section or the portion of the plug body belonging to the coupling surface is concentric or identical to a longitudinal axis of the terminal section. The term "angled plug body" is expediently understood to mean that the longitudinal axis of the terminal section runs angled in a longitudinal section of the plug body relative to a center axis of the valve section or to a portion of the plug body belonging to the coupling surface. It is very preferred that the plug body comply with the VDA standard or the SAE standard for fluid couplings.

It is preferred that the valve seat be a component manufactured separately from the plug body. The valve seat is expediently not integrally designed with the plug body. The valve seat preferably comprises a plastic, and further preferably only plastic. The valve seat is preferably ring shaped, and further preferably circular. The valve seat can be inserted into the plug body through force closure and/or form closure and/or material closure. The valve seat is advantageously latched or clamped into the plug body. It is very advantageous for the plug body to have a radially inwardly extending protrusion, which the valve seat strikes in an axially inward direction during insertion into the plug body. It is preferred that the valve seat abut against the radially inwardly extending protrusion, and preferably be connected or fastened to the latter. The protrusion expediently defines the axial position of the valve seat. It is advantageous that the valve seat be arranged on an axially outward end of the plug body. The valve seat preferably forms an axially outward front surface of the coupling plug. The valve seat preferentially closes an axially outward end of the plug body or the coupling plug. The valve seat advantageously defines an inner diameter of the coupling opening. The effect of separately manufacturing the valve seat relative to the plug body is that the valve seat can then be inserted into the plug body afterwards. As a result, the remaining valve components can initially be inserted into the valve section of the plug body coming from the coupling opening, in order to subsequently or finally insert the valve seat into the plug body. As a result, the plug-in valve does not have to be inserted into the plug body coming from the terminal section, so that the plug body as a whole can be manufactured as one piece and even as an integral part. This ensures a lower production outlay during the manufacture of the plug body, and moreover a greater stability, and ultimately a fluid tightness of the coupling plug.

An inner diameter of the terminal section is advantageously smaller than an inner diameter of the middle section and/or than an inner diameter of the valve section. An inner diameter of the middle section is preferably smaller than an inner diameter of the valve section. The effect of this feature or these features is that it creates an especially compact plug body, which simultaneously ensures low flow resistances. In addition, the different inner diameters allow for the possible formation of steps on an inner side of the plug body, against which the valve holder and/or the valve seat can abut for stability purposes.

The rear side of the valve body of the plug-in valve or its front side facing the valve holder preferably comprises a guide receptacle for accommodating portions of a/the valve guide or a/the valve guide head. It is preferred that the guide receptacle be designed to accommodate at least portions of a/the reset element. It is advantageous that portions, and in particular only portions, of the valve body of the plug-in valve be arranged between the valve holder and the valve seat in the locked state of the plug-in valve.

In the locked state of the plug-in valve, the axial position of the valve body of the plug-in valve is preferably located axially further outward in relation to the axial position of the valve body in the open state of the plug-in valve. This makes it possible to mutually actuate the two valves. According to a preferred embodiment, the valve body of the plug-in valve is located completely outside of the terminal section in the locked state and/or in the open state of the plug-in valve. The effect of the valve body being arranged completely outside of the terminal section is that a smaller flow resistance in the terminal section or a more compact terminal section is achieved.

It is preferred that a fluid line have a coupling plug described above as well as a pipe, wherein the pipe is preferably plugged onto the terminal section or plugged into the terminal section. The terminal section is expediently designed in such a way that a pipe can be plugged onto the terminal section or into the terminal section. The link between the pipe and the terminal section can be achieved through a form closure and/or a force closure and/or a material closure. For example, the link through force closure can be established by radially expanding the pipe while slipping it onto the terminal section, so that a press fit is achieved. For example, the force closure can be improved even further by having the terminal section exhibit at least partially circumferential ribs. For example, a material connection is possible by means of welding, in particular laser welding or friction welding. Among other ways, a form closure can be generated by an interior groove on the pipe. According to a preferred embodiment, the pipe is inserted into the terminal section, and materially fastened to the terminal section via welding, in particular laser welding. Another preferred embodiment involves plugging the pipe onto the terminal section, wherein the terminal section has at least one circumferential rib on its exterior side.

Easier handling and installation is achieved by a coupling assembly comprising a coupling bushing and a coupling plug, wherein the coupling bushing preferably is designed according to the present disclosure, wherein the coupling plug is preferably designed according to the present disclosure, wherein the coupling plug is designed complementary to the coupling bushing and can be inserted fluid-tight into the coupling bushing, wherein the coupling assembly is designed in such a way that the coupling plug can be releasably fixed in the coupling bushing, wherein the coupling bushing has a bushing valve and the coupling plug has a plug-in valve, wherein the coupling assembly is designed in such a way that, during insertion of the coupling plug into the coupling bushing, the bushing valve and the plug-in valve are each moved from a locked state into an open state.

Easier handling and installation is also achieved by a method for connecting a coupling bushing and a coupling plug of a coupling assembly, comprising a coupling bushing and a coupling plug, wherein the coupling bushing is preferably designed according to the present disclosure, wherein the coupling plug is preferably designed according to the present disclosure, wherein the coupling plug is designed complementary to the coupling bushing, and can be inserted fluid-tight into the coupling bushing, wherein the coupling assembly is designed in such a way that the coupling plug can be releasably fixed in the coupling bushing, wherein the coupling bushing has a bushing valve and the coupling plug has a plug-in valve, wherein the coupling assembly is designed in such a way that, during insertion of the coupling plug into the coupling bushing, the bushing valve and the plug-in valve are each moved from a locked state into an open state.

The object mentioned at the outset is achieved by using a coupling bushing according to the present disclosure and/or a coupling plug according to the present disclosure in a vehicle, and in particular in an electric vehicle, preferably for fluidically cooling, and preferably for fluidically cooling a battery of an electric vehicle.

BRIEF DESCRIPTION OF THE DRAWINGS

The present disclosure will be explained in more detail below based on an exemplary embodiment with the help of six figures. Shown on FIG. 1 is a perspective view of a coupling bushing according to the present disclosure.

DETAILED DESCRIPTION

Figure 1:
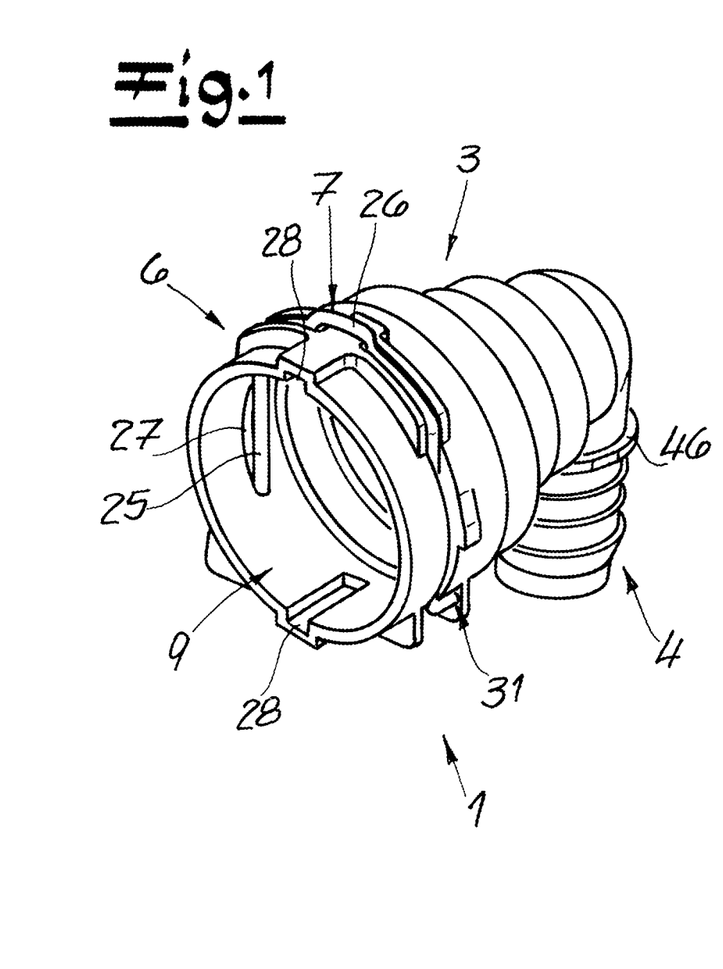

The coupling bushing 1 on FIG. 1 comprises a preferably integral bushing body 3 as well as a retainer 7. The retainer 7 in this exemplary embodiment is made out of wire, and preferably has essentially a U-shaped configuration. In this exemplary embodiment, the retainer 7 as well as the bushing body 3 are designed in such way as to comply with the VDA standard for fluid couplings. In other exemplary embodiments (not shown), the retainer and the bushing body can comply with the SAE standard, for example. The bushing body 3 has a coupling section 6, which is bordered axially outwardly by a coupling opening 9. He retainer 7 is advantageously arranged in the coupling section 6.

Figure 2:
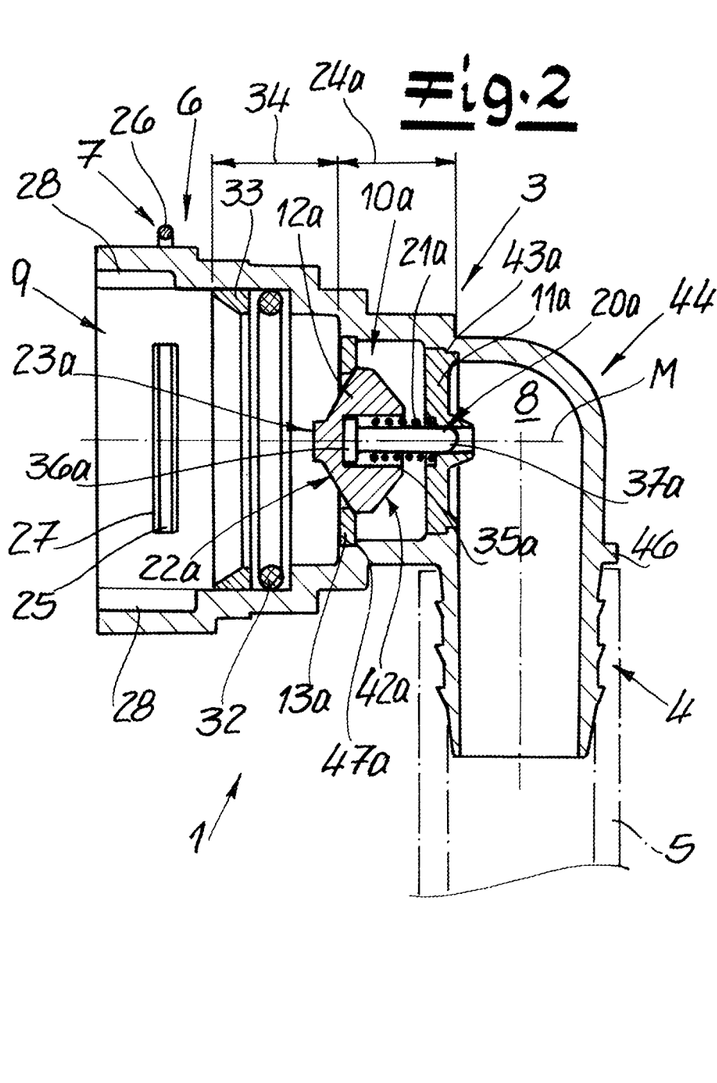
FIG. 2 is a longitudinal section through the coupling bushing according to FIG. 1.

The bushing body 3 further comprises a connecting section 4, for example which can have circumferential, barbed ribs, which provide a good force closure with a pipe 5 to be plugged on (see FIG. 2). In other exemplary embodiments, however, the connecting section can also be designed in such a way that the pipe can be inserted into the connecting section, and for example be fastened to the connecting section via laser welding. The coupling bushing 1 and the pipe 5 can together form a fluid line 1, 5. It is preferred that the pipe 5 and/or the bushing body 3 have a plastic, and preferably be completely manufactured out of plastic.

In this exemplary embodiment, the retainer 7 has a base 26 and also preferably two latching elements 25, which advantageously consist of two legs. The base 26 and the latching elements 25 together preferably yield a U-shape of the retainer 7. In other exemplary embodiments, the retainer can in particular also have a completely circulating, and thus ring-like, configuration. In this exemplary embodiment, the base 26 is mounted between two flanges on an exterior side of the bushing body, while the two latching elements 25 are arranged in a respective recess 27 of the bushing body 3 when the retainer 7 is completely introduced into the bushing body 3. For example, the ends of the latching elements 25 can extend in an axial direction, and can be accommodated by a respective leg receptacle 31 of the bushing body 3.

The bushing body 3 preferably comprises at least one safety element 28, and preferably two safety elements 28. The safety elements 28 in this exemplary embodiment are configured like grooved receptacles, and serve as an anti-twist safeguard for a coupling plug 2 shown on FIGS. 4 and 5. For this purpose, the coupling plug 2 preferentially has one or two safety parts 29, which engage into the safety elements 28 in a complementary, and thus a preferably spring-like, manner while the coupling plug 2 is being introduced into the coupling bushing 1.

With regard to FIG. 1, it is preferred that an outer diameter of the bushing body 3 with the coupling section 6 taper increasingly, and preferably incrementally, starting in the direction of the connecting section 4. It is advantageous that the connecting section 4 according to FIG. 2 to the rest of the bushing body 3 be bordered by a flange 46, which advantageously serves as a stop for the pipe 5.

According to FIG. 2, the connecting section 4 and the coupling section 6 are fluidically connected with each other by an inner channel 8. With the coupling plug 2 inserted, a seal 32 abuts against an exterior side of the coupling plug 2 with force closure (see in particular FIG. 6), so that the lumens of the coupling plug 2 and the coupling bushing 1 are fluidically sealed to the outside. The coupling bushing 1 advantageously comprises a seal holder 33, which preferably is fastened as a separate ring in the bushing body 3 for fixing the seal 32 in place. Fastening can take place in particular by latching the seal holder 33 on an interior side of the bushing body 3.

The portion of the inner channel 8 allocated to the coupling section 6 has a center axis M in the longitudinal section of FIG. 2. The center axis M defines an axial direction as well as a radial direction, and additionally a circumferential direction. Directional data expediently always refer to the corresponding section, so that the axial direction of the connecting section can be a direction other than the axial direction of the coupling section, and in this exemplary embodiment in fact is. The axial direction is differentiated into an axially inward direction below, which runs toward the pipe 5 or the connecting section 4. Consequently, the axially outward direction is to be understood as a direction toward the coupling opening 9.

According to the present disclosure, the coupling bushing 1 comprises a bushing valve 10*a*, which is arranged in the bushing body 3 or placed in the latter. The bushing valve 10*a* comprises a valve holder 11*a*, an axially movable valve body 12*a* as well as a valve seat 13*a*. The bushing valve 10*a* preferably further has a valve guide 20*a* as well as a reset element 21*a*. The reset element 21*a* in this exemplary embodiment is configured like a coil spring, while the valve guide 20*a* preferably has a rod- or bolt-shaped design. The valve body 12*a* preferably comprises a plastic, further preferably an elastomer, and particularly preferably a thermoplastic elastomer. By contrast, the valve seat 13*a* can have a harder plastic than the valve body 12*a*. It is advantageous that the valve seat 13*a* be configured like a washer, and can be latched in the bushing body 3.

Figure 3:
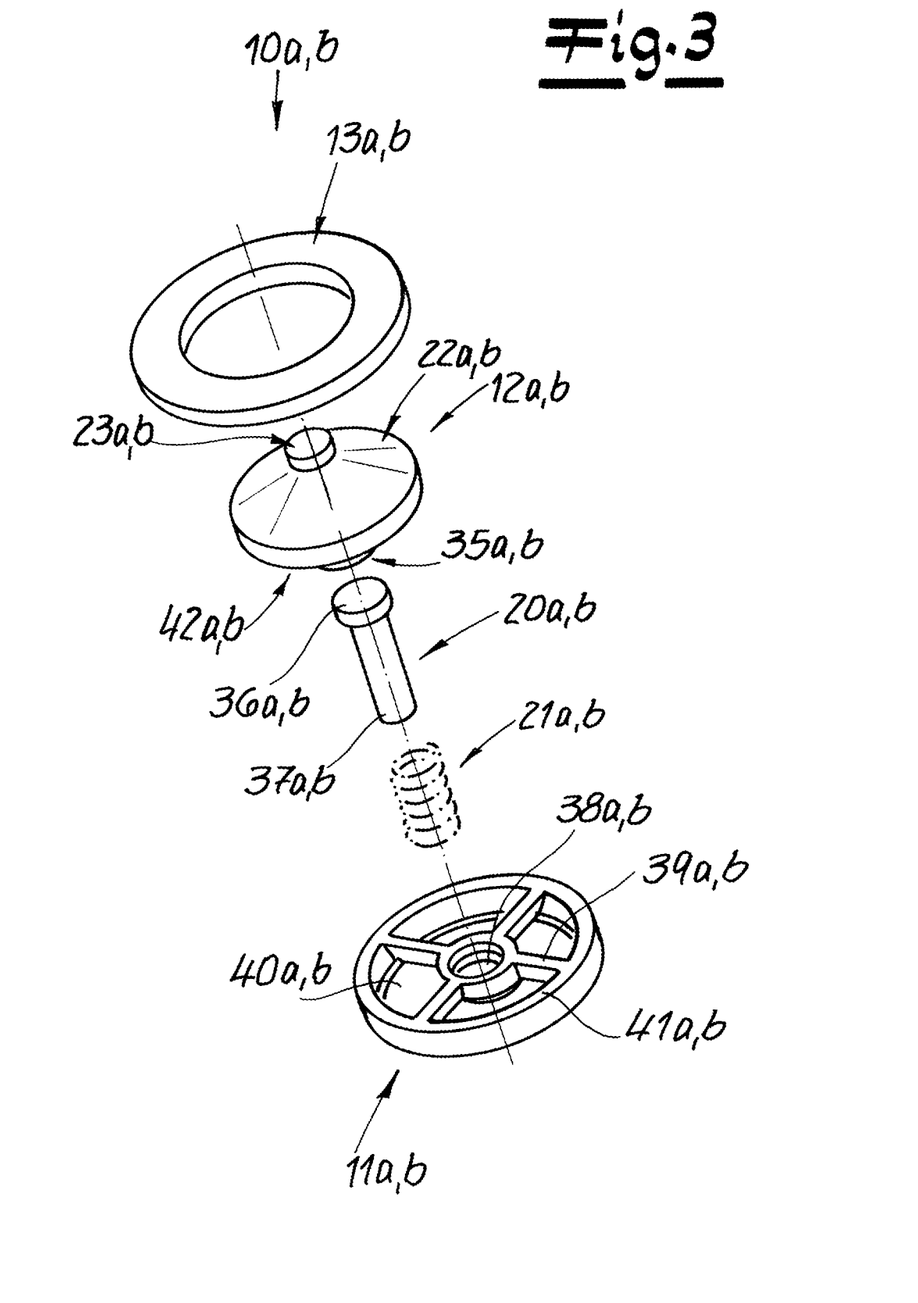
FIG. 3 is a valve of the coupling bushing according to FIG. 2 in an exploded view.

FIG. 3 illustrates the structure of the bushing valve 10*a* in a bit more detail. Consequently, the valve body 12*a* preferably has a pressure surface 23*a*, which represents the axially outward front end of the valve body 12*a* (see also FIG. 2). In this exemplary embodiment, the pressure surface 23*a* is followed by a section that expands in an axially inward direction, portions of which preferably abut with a sealing surface 22*a* against the valve seat 13*a* in a locked state of the bushing valve 10*a*. The sealing surface 22*a* in this exemplary embodiment is a partial section of the axially inwardly expanding portion of the valve body 12*a*. As evident in a further axially inward direction on FIGS. 2 and 3, the valve body 12*a* has a rear side 42*a* with a portion that tapers in the longitudinal section, so that the valve body 12*a* in this exemplary embodiment is rhomb or diamond shaped in the longitudinal section.

On a front side lying opposite the pressure surface 23*a*, the valve body 12*a* according to FIGS. 2 and 3 advantageously has a guide receptacle 35*a* for the valve guide 20*a*, and expediently also for the reset element 21*a*. In order to securely fasten the valve guide 20*a* in the valve body 12*a* or in its guide receptacle 35*a*, the valve guide 20*a* can have an advantageously projecting guide head 36*a*. For example, the guide head 36*a* can have a roughly T-shaped configuration. The valve body 12*a* advantageously has an elastic design, so that it can accommodate the guide head 36*a* via latching or force closure. As evident in particular on FIG. 2, the reset element 21*a* envelops portions of the valve guide 20*a* in this exemplary embodiment. An axially outward end of the reset element 21*a* is preferably mounted in the valve body 12*a*, wherein an axially inward end of the reset element 21*a* is preferably supported against the valve holder 11*a*. The valve holder 11*a* is advantageously fastened to a radially inwardly extending projection 43*a* of the bushing body 3, and preferably latched in. The valve seat 13*a* is preferably fastened to a radially inwardly extending protrusion 47*a* of the bushing body 3, and preferably latched in.

The perspective view on FIG. 3 makes the valve holder 11*a* especially well discernible. The valve holder 11*a* advantageously has a guide passage 38*a*, in which a guide foot 37*a* of the valve guide 20*a* is axially movably mounted. This axial mobility of the valve guide 20*a* is made evident in particular by a comparison of FIGS. 2 and 6. The valve holder 11*a* can have a ring 41*a*, which is used to fasten the valve holder 11*a* in the bushing body 3, for example through latching. It is preferred that the valve holder 11*a* have struts 39*a*, which connect the ring 41*a* with the guide passage 38*a*. The struts 39*a* simultaneously form windows 40*a*, through which the fluid can flow. Due to the respectively selected perspective, however, the windows 40*a* are visible on FIG. 3, but not on FIG. 2.

The valve holder 11*a* and the valve seat 13*a* border a valve section 24*a*, as evident on FIG. 2. In this exemplary embodiment, the valve section 24*a* is bordered in an axially outward direction by a sealing section 34, wherein the sealing section 34 is preferably determined by the valve seat 13a and the seal holder 33. The sealing section 34 is expediently arranged between the coupling section 6 and the valve section 24a. In this exemplary embodiment, the coupling bushing 1 has an angled configuration, so that a longitudinal axis of the connecting section 4 is angled relative to the center axis M. As a consequence, an angle section 44 is arranged between the connecting section 4 and the valve section 24a in this exemplary embodiment. In other exemplary embodiments, the longitudinal axis of the connecting section is aligned concentrically with the center axis M, so that the angle section 44 is omitted in these exemplary embodiments.

It is preferred that an inner diameter of the connecting section 4 be smaller than an inner diameter of the valve section 34a. An inner diameter of the valve section 24a is preferably smaller than an inner diameter of the sealing section 34. It is preferred that an inner diameter of the sealing section 34 be smaller than an inner diameter of the coupling section 6.

Figure 4:
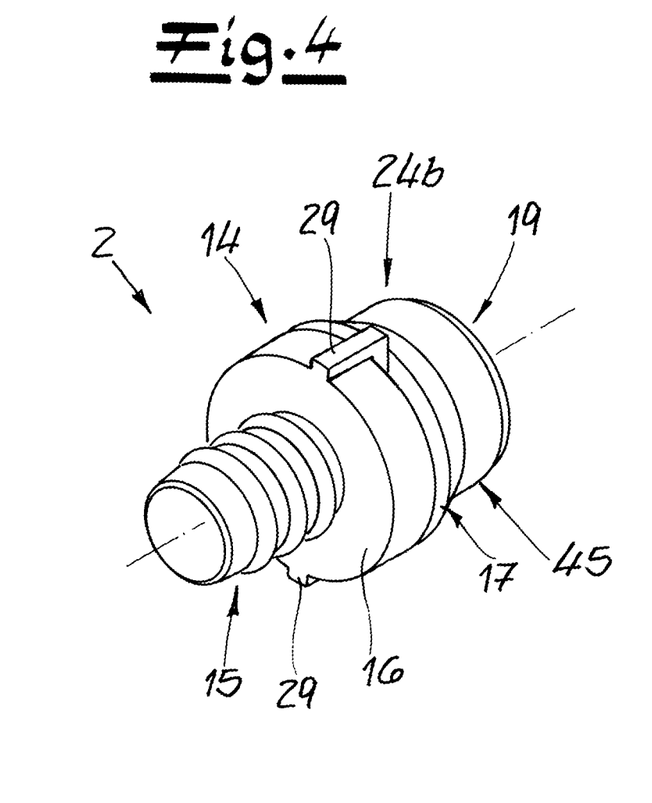
FIG. 4 is a perspective view of a coupling plug according to the present disclosure.

FIG. 4 shows a perspective view of the coupling plug 2. Consequently, the coupling plug 2 comprises a plug body 14, which in this exemplary embodiment was fabricated via injection molding in an integral manner, and hence simultaneously also as a single piece. The plug body 14 comprises a terminal section 15 for linkage to an additional pipe not shown on FIG. 4. The terminal section 15 in this exemplary embodiment is configured so that the additional pipe can be plugged onto the terminal section 15. In other exemplary embodiments, the terminal section can be configured in such a way that the additional pipe can be inserted into the latter, and welded therein, for example. For example, welding can take place by means of laser welding or frictional welding. According to the present disclosure, the plug body 14 comprises a coupling surface 45, which is configured to be radially complementary to the seal 32 of the coupling bushing 1. At an axially outward end of the plug body 14, the coupling surface 45 can taper in an axially outward direction to make it more insertable into the coupling bushing 1. A front wall located at the axially outward end of the coupling plug 2 forms a coupling opening 19.

Figure 5:
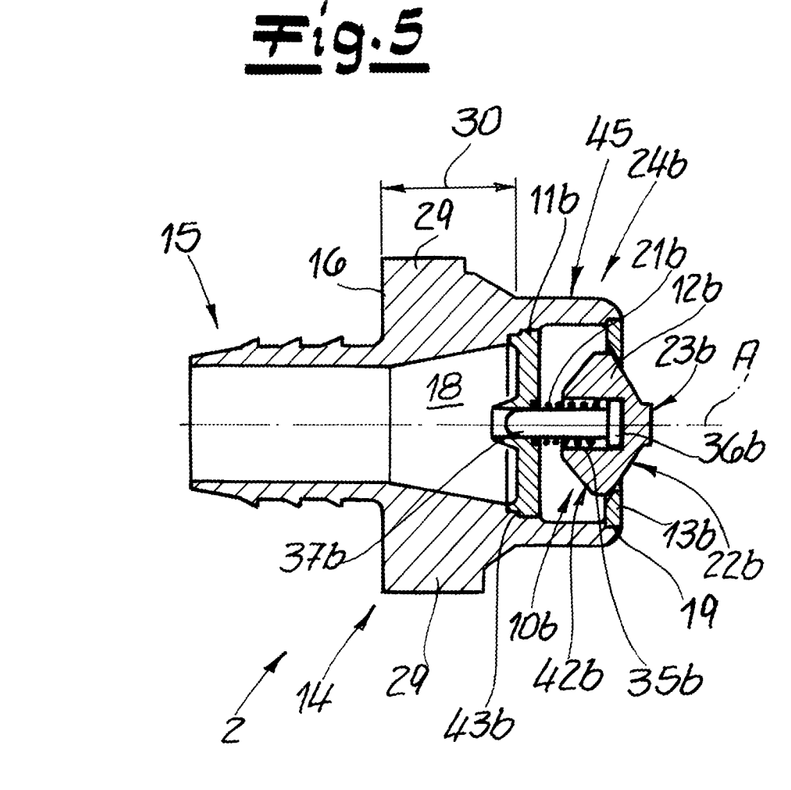
FIG. 5 is a longitudinal section though the coupling plug from FIG. 4.

A middle section 30 is located between the terminal section 15 and the coupling surface 45, as may be gleaned in particular from FIG. 5. In this exemplary embodiment, the middle section 30 is defined by a flange 16, which can serve in particular as a stop for the additional pipe that is not depicted here. In this exemplary embodiment, the two already mentioned safety parts 29 are arranged diametrically opposite each other on the flange 16, so that the safety elements 28 of the coupling bushing 1 can be accessed to safeguard against twisting. A conically tapering portion advantageously follows the safety parts 29 in an axially outward direction, which is to be allocated partially to the middle section 30 and partially to a valve section 24b. In the case of the coupling plug 2, the valve section 24b is preferably defined by the axial expansion, which is spanned by rigid elements 11b, 13b of a plug-in valve 10b.

In this exemplary embodiment, the plug-in valve 10b is configured identically to the bushing valve 10a, so that the individual elements of the plug-in valve 10a are named identically to those elements of the bushing valve 10a. The reference sign abbreviation "b" always denotes valve elements of the coupling plug 2, while the reference sign abbreviation "a" is reserved for valve elements of the coupling bushing 1. The structure and the function of the plug-in valve 10b are preferably the same as in the case of the bushing valve 10a, so that the description for the bushing valve 10a is to be applied analogously to the plug-in valve 10b.

An axial section of the plug-in body 2 allocated to the coupling surface 45 or the valve section 24b has a middle axis A, which defines an axial direction, a radial direction as well as a circumferential direction of this axial section. In this exemplary embodiment, the coupling plug 2 has a straight design, so that a longitudinal axis of the terminal section 15 is identical to the middle axis A of the valve section 24b. In other exemplary embodiments, the terminal section 15 or its longitudinal axis can be aligned at an angle to the middle axis A.

The coupling opening 19 or the valve section 24b is fluidically connected with the terminal section 15 via a fluid channel 18. An inner diameter of the terminal section 15 is preferably smaller than an inner diameter of the valve section 24. An inner diameter of the middle section 30 is preferentially smaller than the inner diameter of the valve section 24b, and preferably larger than the inner diameter of the terminal section 15.

According to FIG. 4, the coupling plug 2 has at least one locking element 17, and preferably two locking elements 17. The locking element 17 or the locking elements 17 are advantageously designed as grooves on the exterior side of the plug body 2, into which the latching elements 25 of the retainer 7 of the coupling bushing 1 engage. It is preferred that the conical section of the plug body 14 be designed to increasingly spread apart the latching elements 25 of the retainer 7 while introducing the coupling plug 2, until the legs 25 latch into the locking elements 17, thereby locking the coupling plug 2 into the coupling bushing 1.

Figure 6:
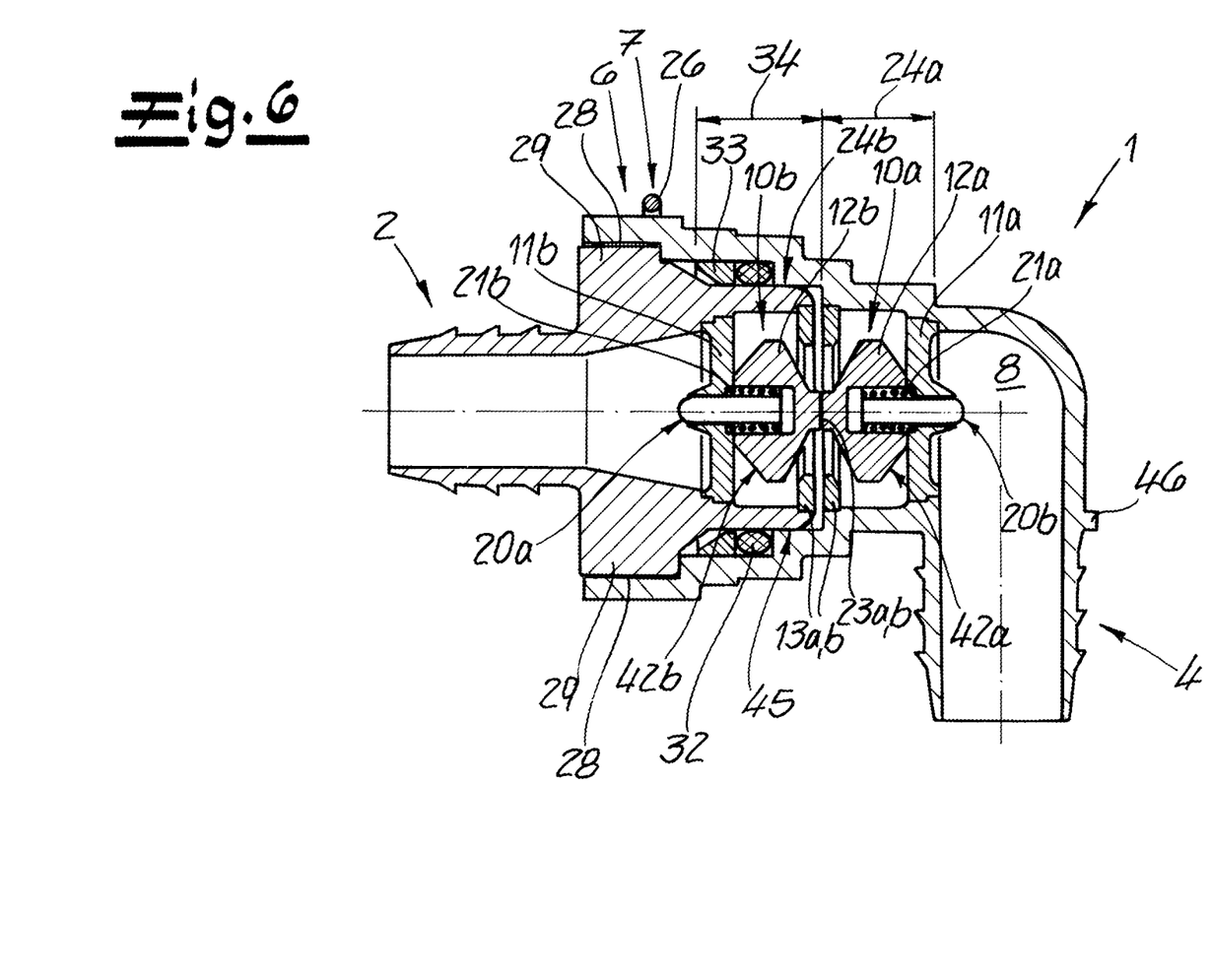
FIG. 6 is a longitudinal section through a coupling assembly according to the present disclosure, comprising the coupling bushing according to FIG. 2 and the coupling plug according to FIG. 5.

While FIG. 6 shows the coupling plug 2 locked into the coupling bushing 1, the latching elements 25 are not visible in the perspective selected on FIG. 6. However, the base 26 of the retainer 7 there illustrates the axial position of the latching elements 25. As evident on this figure, the safety parts 29 of the coupling plug 2 are located in the safety elements 28 of the coupling bushing 1. At the same time, the seal 32 abuts against the coupling surface 45 with force closure. Therefore, FIG. 6 shows a locked state of a coupling assembly 1, 2 consisting of the coupling bushing 1 and the coupling plug 2.

FIG. 6 emphasizes that the pressure surfaces 23a and 23b abut against each other, as a result of which the respective valve bodies 12a and 12b are moved axially inward, and in this exemplary embodiment each abut against the valve holder 11a or 11b. In like manner, the respective valve guide 20a or 20b was pushed further into the respective axially inward direction, so that the guide feet 37a and 37b of the valve guides 20a and 20b project in a respective axially inward direction relative to the respective valve holder 11a or 11b. As a result, the two reset elements 21a and 21b are equally compressed, so that roughly the same reset energy is stored in both reset elements 21a and 21b.

Because the two valve bodies 12a and 12b mutually impacted each other, both valve bodies 12a and 12b have detached from the respective valve seat 13a or 13b, so that the fluid can flow in both directions. Consequently, the coupling assembly 1, 2 is configured in such a way that both valves 10a and 10b are fluidically opened concurrently with the mechanical locking by the retainer 7. Conversely, if the coupling assembly 1, 2 is now released and the coupling plug 2 is pulled out of the coupling bushing 1, both valves 10a and 10b close automatically, so that the coupling assembly 1, 2 can be released with practically no fluid loss, without emptying the fluid line beforehand.

During operation, and thus in the connected state of the coupling assembly 1, 2, the fluid flows from the coupling plug 2 to the coupling bushing 1 or vice versa, depending on the application. It here flows through the windows 40a, 40b of the two valve holders 11a, 11b and through the openings of the two valve seats 13a, 13b. The portions of the valve body 12a, 12b that expand or taper in the axial direction ensure that the fluid can flow past the valve bodies 12a, 12b with the least possible flow resistance. For example, if the valve bodies had a rectangular design in longitudinal section, the fluid would encounter perpendicular walls, which even in the open state of the valves 10a, 10b would cause significant eddies, and hence flow resistances. In other exemplary embodiments not shown here, the contours of the valve bodies 12a, 12b could have a rounded design in longitudinal section, making it possible to reduce the turbulences even further.

Even more components of the coupling assembly are advantageously configured in such a way as to somewhat diminish the flow resistance generated by the valves 10a, 10b themselves. It is preferred that an axially inward front wall of the valve guides 20a, 20b taper in the longitudinal section in a respective axially inward direction. The axially inward front wall of the valve guide 20a, 20b preferably has a rounded design in longitudinal section. In the open state of the respective valve 10a, 10b, the axially inward front wall of the valve guides 20a, 20b preferably aligns with the respective valve holder 11a, 11b. It is preferred that the middle section 30 of the coupling plug 2 have a conical portion on the interior side facing the fluid channel 19. It is preferred that the conical portion have an axial expansion, which corresponds to at least one third, and preferably to at least one half, of the axial length of the middle section 30.

Reference List:

| Ref. | Designation |
|---|---|
| 1 | Coupling bushing |
| 2 | Coupling plug |
| 3 | Bushing body |
| 4 | Connecting section of 1, 3 |
| 5 | Pipe |
| 6 | Coupling section of 1, 3 |
| 7 | Retainer of 1 |
| 8 | Inner channel of 1, 3 |
| 9 | Coupling opening of 1, 3 |
| 10a 10b | Bushing valve of 1 Plug-in valve of 2 |
| 11a 11b | Valve holder of 10a, 10b |
| 12a 12b | Valve body of 10a, 10b |
| 13a 13b | Valve seat of 10a, 10b |
| 14 | Plug body |
| 15 | Terminal section of 2 |
| 16 | Flange of 2 |
| 17 | Locking element of 2 |
| 18 | Fluid channel of 2 |
| 19 | Coupling opening of 2 |
| 20a 20b | Valve guide of 10a, 10b |
| 21a 21b | Reset element of 10a, 10b |
| 22a 22b | Sealing surface of 12a, 12b |
| 23a 23b | Pressure surface of 12a, 12b |
| 24a 24b | Valve section of 3, 14 |
| 25 | Latching element of 7 |

-continued

Reference List:

| Ref. | Designation |
|---|---|
| 26 | Base of 7 |
| 27 | Recess of 3 |
| 28 | Safety element of 1 |
| 29 | Safety part of 2 |
| 30 | Middle section of 2 |
| 31 | Leg receptacle of 1 for 25 |
| 32 | Seal of 1 |
| 33 | Seal holder of 1 |
| 34 | Sealing section of 1 |
| 35a 35b | Guide receptacle of 12a, 12b |
| 36a 36b | Guide head of 20a, 20b |
| 37a 37b | Guide foot of 20a, 20b |
| 38a 38b | Guide passage of 11a, 11b |
| 39a 39b | Strut of 11a, 11b |
| 40a 40b | Window of 11a, 11b |
| 41a 41b | Ring of 11a, 11b |
| 42a 42b | Rear side of 12a, 12b |
| 43a 43b | Projection of 3, 14 for 11a, 11b |
| 44 | Angle section of 3 |
| 45 | Coupling surface of 2 |
| 46 | Flange of 1 |
| 47a 47b | Protrusion of 3, 14 for 13a, 13b |
| M | Center axis of 1 |
| A | Middle axis of 2 |

The invention claimed is:

1. A coupling bushing for fluidic coupling with a coupling plug, wherein the coupling busing comprises:
a bushing body, wherein the bushing body comprises a connecting section configured for connection with a tube or with an aggregate, and a coupling section for coupling with the coupling plug, wherein the coupling bushing is configured such that the coupling plug can be inserted into the coupling bushing,
wherein the coupling bushing has a retainer for locking the coupling plug into the bushing body, wherein the coupling section and the connecting section of the bushing body are fluidically connected with each other via an inner channel, wherein the portion of the inner channel allocated to the coupling section, in a longitudinal section of the coupling bushing, defines a center axis (M) as well as an axial and a radial direction as well as a circulating direction, wherein the coupling section ends with a coupling opening in an axially outward direction,
wherein a bushing valve is arranged in the inner channel, wherein the bushing valve comprises a valve holder, an axially movable valve body and a valve seat, wherein the valve seat is a component manufactured separately from the bushing body, wherein the valve holder and the valve seat define a valve section of the bushing body or the coupling bushing in an axial direction, wherein the bushing valve has a valve guide, wherein the valve guide defines the direction of movement of the valve body, wherein the valve body envelops at least axial portions of the valve guide in a radial direction, wherein the coupling bushing is designed in such a way that the valve body abuts fluid-tight against the valve seat in a locked state of the bushing valve, and does not abut against the valve seat in an open state of the bushing valve, wherein an axially inward front wall of the valve guide is tapered inwardly, and wherein the front wall is aligned with an inward surface of the valve holder, wherein the retainer comprises at least one latching element, wherein the at least one latching element has a resiliently elastic design, wherein the at least one latching element is configured to engage with the coupling plug.

2. The coupling bushing according to claim 1, wherein the coupling bushing is configured such that the valve holder and/or the valve body and/or the valve seat can be inserted or is/are inserted into the plug body in an axially inward direction.

3. The coupling bushing according to claim 1, wherein the bushing body has a radially inwardly extending projection, to which the valve holder is connected or fastened.

4. The coupling bushing according to claim 1, wherein an inner diameter of the connecting section is smaller than an inner diameter of the valve section.

5. The coupling bushing according to claim 1, wherein the valve body in a longitudinal section has a section that expands in an axially outward direction, and a section that tapers in an axially outward direction.

6. The coupling bushing according to claim 1, wherein the bushing valve comprises a reset element, wherein the reset element exerts a force on the valve body in the direction of the valve seat.

7. The coupling bushing according to claim 1, wherein the valve body has an axially outward front end, wherein the axially outward front end comprises a flat pressure surface, wherein the flat pressure surface is located in a plane situated perpendicular to the center axis (M).

8. The coupling bushing according to claim 1, wherein the axial position of the valve body in the locked state of the bushing valve is located axially further outward in relation to the axial position of the valve body in the open state of the bushing valve.

9. A fluid line, comprising the coupling bushing of claim 1 and the tube connected to the coupling bushing.

10. The coupling bushing according to claim 1, wherein the axially inward front wall of the valve guide is rounded.

11. The coupling plug for fluidic connection with the coupling bushing of claim 1, wherein the coupling plug comprises a plug body, wherein the plug body comprises a terminal section for linking to a second pipe or a second aggregate, and a coupling surface for coupling with the coupling bushing, wherein the coupling plug is configured such that the coupling bushing can be plugged onto the coupling plug, wherein the coupling plug has a locking element for locking the coupling plug into the coupling bushing, wherein the axial section of the plug body allocated to the coupling surface and the terminal section are fluidically connected with each other via a fluid channel, wherein the portion of the fluid channel allocated to the coupling surface defines a middle axis (A) as well as an axial and a radial direction as well as a circumferential direction in a longitudinal section of the coupling plug, wherein the coupling surface ends in an axially outward direction by a coupling opening, wherein a plug-in valve is arranged in the fluid channel, wherein the plug-in valve comprises a valve holder, an axially movable valve body and a valve seat, wherein the valve holder and the valve seat define a valve section of the plug body or the coupling plug in an axial direction, wherein the valve seat is a component manufactured separately from the plug body, wherein the coupling plug is designed in such a way that the valve body abuts fluid-tight against the valve seat in a locked state of the plug-in valve, and does not abut against the valve seat in an open state of the plug-in valve, wherein the plug-in valve has a valve guide, wherein the valve guide defines the direction of movement of the valve body, wherein the valve body envelops at least axial portions of the valve guide in a radial direction, wherein, in the coupling plug an axially inward front wall of the valve guide is tapered inwardly, and wherein the front wall is aligned with an inward surface of the valve holder.

12. The coupling plug according to claim 11, wherein, in the coupling plug, the axially inward front wall of the valve guide is rounded.

* * * * *